(12) United States Patent  
Sealy et al.

(10) Patent No.: US 9,261,033 B2  
(45) Date of Patent: Feb. 16, 2016

(54) SYSTEMS AND METHODS FOR IMPROVING CATALYST DIAGNOSTICS IN THE PRESENCE OF SENSOR DEGRADATION

(71) Applicant: Ford Global Technologies, LLC, Dearborn, MI (US)

(72) Inventors: Brent Edward Sealy, Plymouth, MI (US); Michael Casedy, Ann Arbor, MI (US); Timothy Robert Gernant, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/284,839

(22) Filed: May 22, 2014

(65) Prior Publication Data

US 2015/0337750 A1    Nov. 26, 2015

(51) Int. Cl.
*F01N 3/00* (2006.01)
*F02D 41/02* (2006.01)
*F01N 11/00* (2006.01)
*F01N 3/20* (2006.01)

(52) U.S. Cl.
CPC .............. *F02D 41/0235* (2013.01); *F01N 3/20* (2013.01); *F01N 11/00* (2013.01)

(58) Field of Classification Search
CPC . F01N 2610/02; F01N 3/2066; F01N 3/0842; F01N 13/02; F01N 2610/03; F01N 2250/02; F01N 11/007; F01N 11/00; F01N 11/002; F02D 41/1441

USPC ................... 60/273, 274, 285, 286, 277, 299; 73/114.75

See application file for complete search history.

(56) References Cited

U.S. PATENT DOCUMENTS

| | | | | |
|---|---|---|---|---|
| 5,416,710 A * | 5/1995 | Kuroda et al. | ........ | F01N 11/002 60/274 |
| 5,672,817 A * | 9/1997 | Sagisaka et al. | ...... | F02D 41/123 123/672 |
| 5,732,553 A * | 3/1998 | Mitsutani | .............. | F01N 11/007 60/276 |
| 2011/0083425 A1* | 4/2011 | Sealy et al. | ............. | F01N 3/101 60/277 |
| 2013/0054083 A1 | 2/2013 | Genslak et al. | | |

FOREIGN PATENT DOCUMENTS

| | | | |
|---|---|---|---|
| EP | 1437501 B1 | | 3/2007 |
| JP | 06280662 A | * | 10/1994 |
| JP | 2008138560 A | * | 6/2008 |
| JP | 2009036117 A | * | 2/2009 |
| JP | 2009156201 A | * | 7/2009 |
| WO | 9925966 A1 | | 5/1999 |

* cited by examiner

*Primary Examiner* — Patrick Maines
(74) *Attorney, Agent, or Firm* — Julia Voutyras; Alleman Hall McCoy Russell & Tuttle LLP (57) ABSTRACT

Systems and methods for diagnosing operation of a catalyst are presented. In one example, threshold limits for catalyst variables are adjusted in response to attributes of a catalyst monitor sensor that may vary with sensor age. The catalyst variables may provide insight into whether or not the catalyst is degraded or operating as intended.

7 Claims, 7 Drawing Sheets

SYSTEMS AND METHODS FOR IMPROVING CATALYST DIAGNOSTICS IN THE PRESENCE OF SENSOR DEGRADATION

FIELD

The present description relates to systems and methods for improving catalyst diagnostics for a vehicle. The system and methods may be particularly useful for vehicle that experience changes in sensor output dynamics.

BACKGROUND AND SUMMARY

Vehicles may include a catalyst for processing engine emissions. Performance of a catalyst may degrade over time due to the catalyst being exposed to elevated temperatures, mechanical vibration, sulfur contamination, and exposure to other operating conditions that may be encountered during a course of operation. If a catalyst degrades by more than a desired amount, vehicle tailpipe emissions may be elevated to an undesirable level. Thus, it may be desirable to provide a robust way of judging if a catalyst is performing as desired.

One way of diagnosing operation of a catalyst is to use oxygen sensor information. In particular, oxygen sensors may be placed in an exhaust system upstream and downstream of a catalyst. Information from the upstream and downstream oxygen sensors may be a basis for judging whether or not a catalyst is performing in a desired way. However, oxygen sensor performance may degrade over time. Output of a degraded oxygen sensor may lead to judging that a poor performing catalyst is performing in a desired manner. Therefore, it may be desirable to provide a way of separating oxygen sensor performance from catalyst performance when judging if a catalyst is operating as desired.

The inventors herein have recognized the above-mentioned disadvantages and have developed a method for diagnosing a catalyst, comprising: adjusting a catalyst degradation threshold in response to a slope of a catalyst monitor sensor output; indicating catalyst degradation in response to a variable not exceeding the catalyst degradation threshold; and adjusting a state of an actuator in response to the indication of degradation.

By adjusting a catalyst diagnostic limit in response to an attribute of a catalyst monitor sensor, it may be possible to provide the technical result of improving catalyst diagnostics. In particular, an output voltage of a catalyst monitor sensor may change with age such that when the catalyst monitor sensor is part of a diagnostic to determine catalyst performance, catalyst oxygen storage may be overestimated. However, the catalyst oxygen storage estimate limit and a threshold amount of fuel provided to reactivate the catalyst may be adjusted to compensate for the catalyst sensor dynamics. Specifically, the oxygen storage estimate limit and the threshold fuel amount to reactivate the catalyst and provide rich exhaust constituent breakthrough downstream of the catalyst may be increased in response to a change in catalyst monitor sensor slope, or alternatively the catalyst monitor sensor time constant.

The present description may provide several advantages. For example, the approach may provide more reliable catalyst diagnostic evaluations. Further, the approach may reduce vehicle emissions via providing an indication of degraded catalyst operation. Further still, the approach may comply with on board diagnostic regulations.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
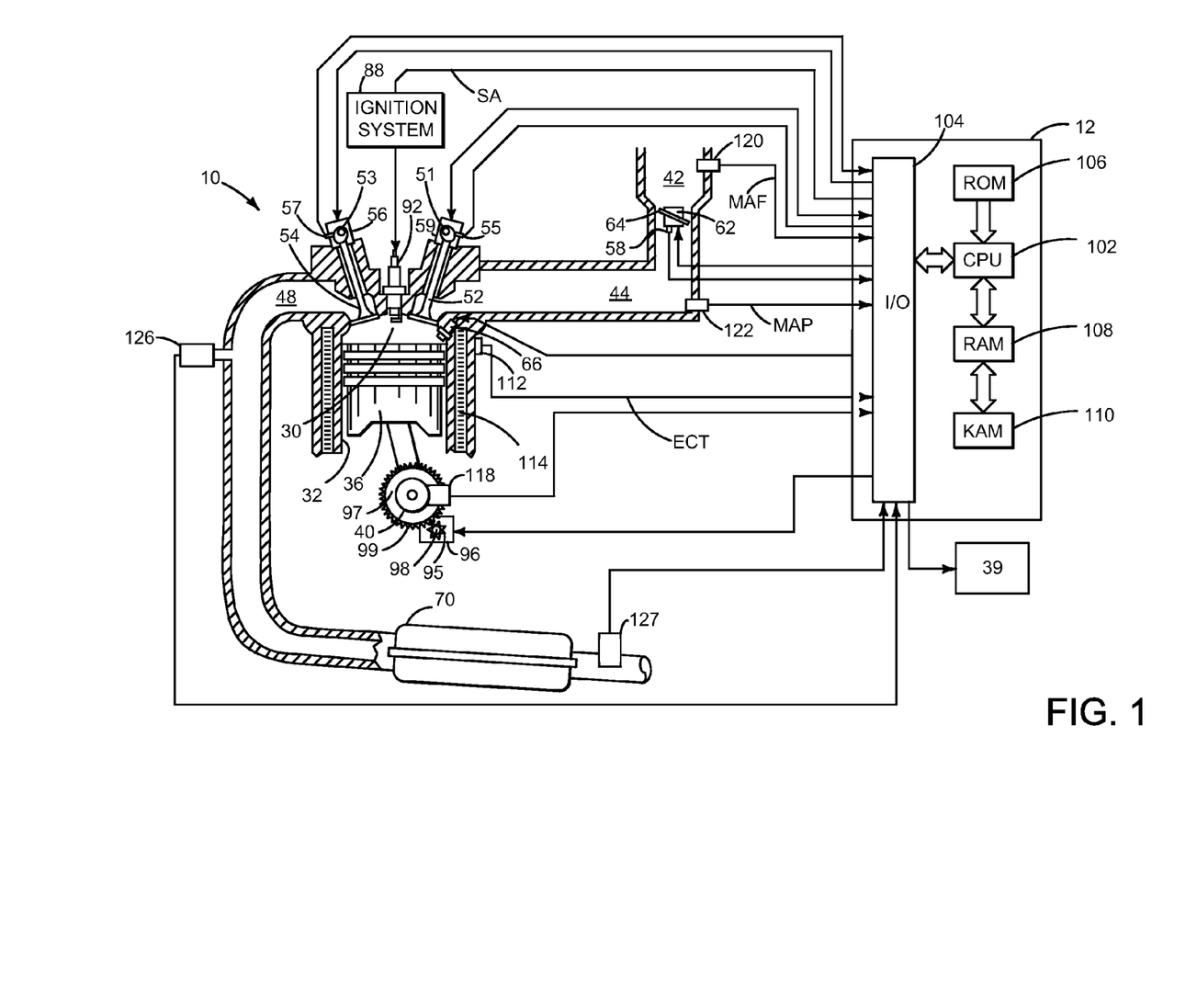
FIG. 1 is a schematic diagram of an engine and exhaust gas after treatment system.
Figure 2:
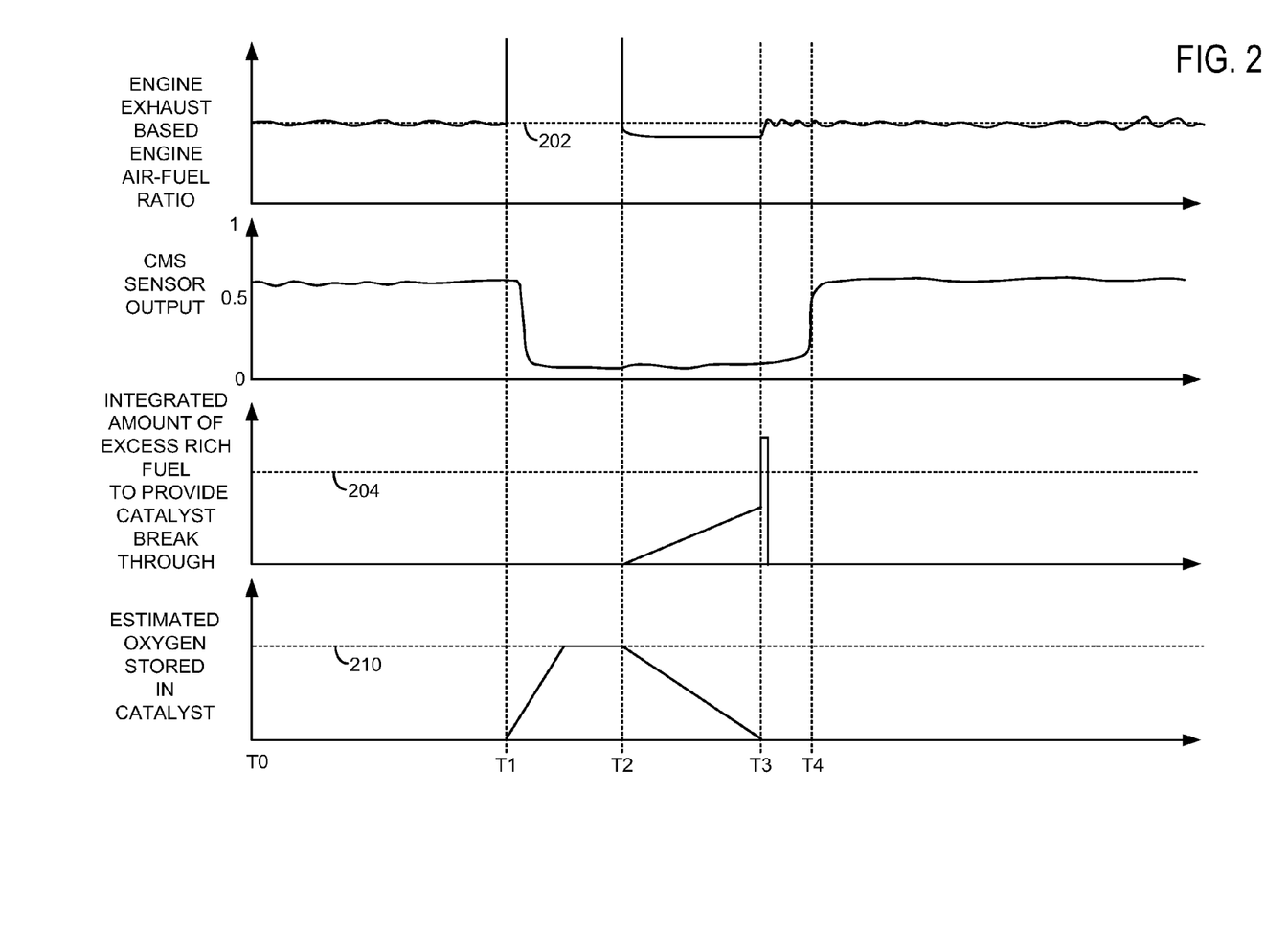
FIGS. 2 and 3 show simulated catalyst diagnostic sequences.
Figure 3:
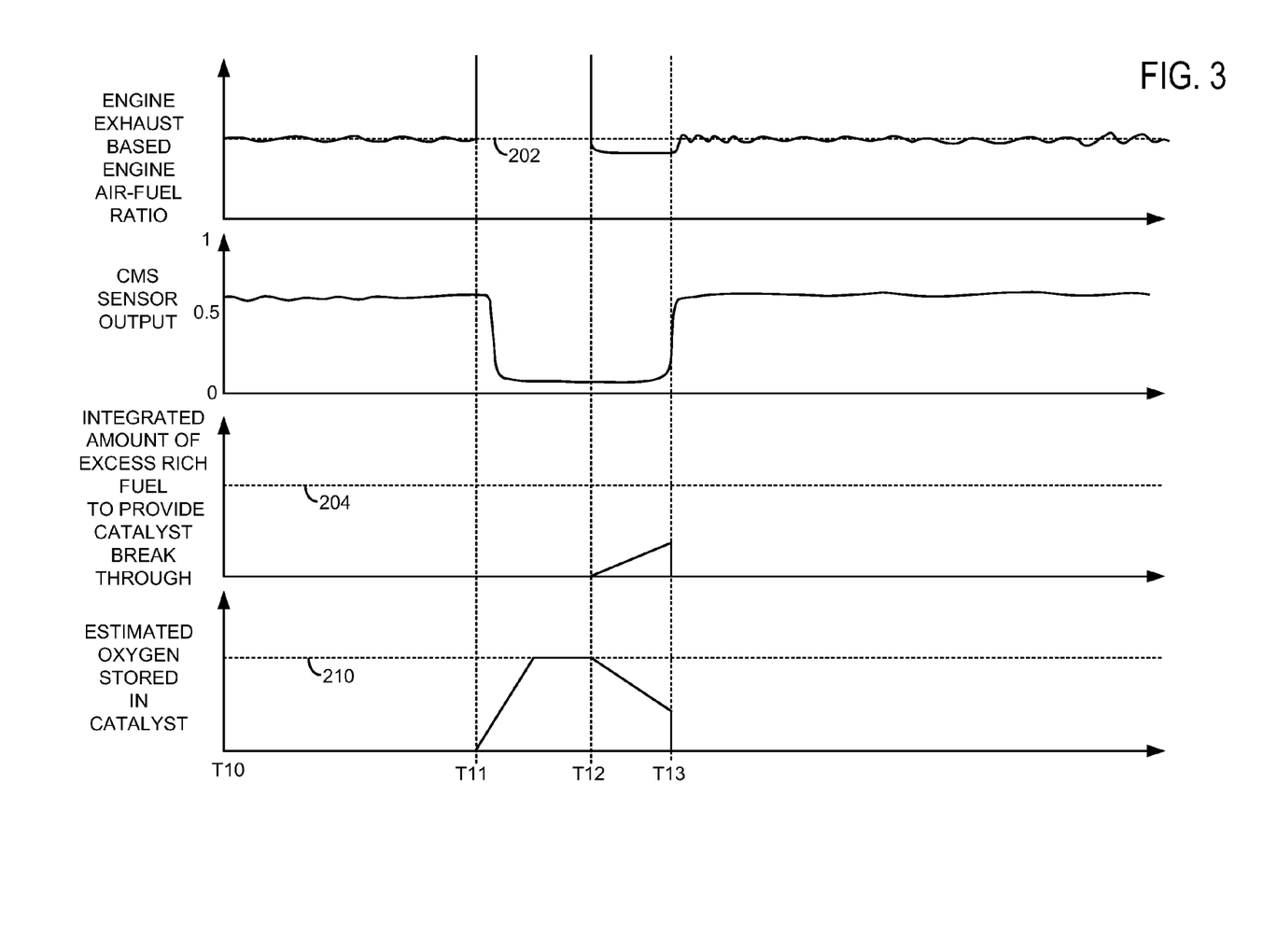
Figure 4:
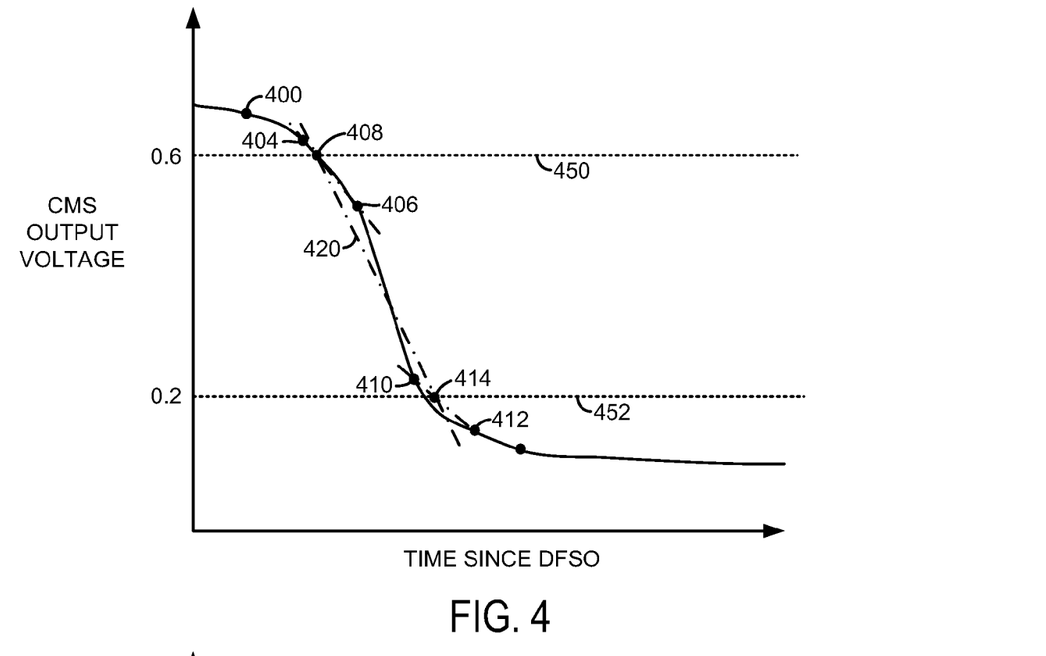
FIGS. 4 and 5 show simulated CMS output characteristics.
Figure 5:
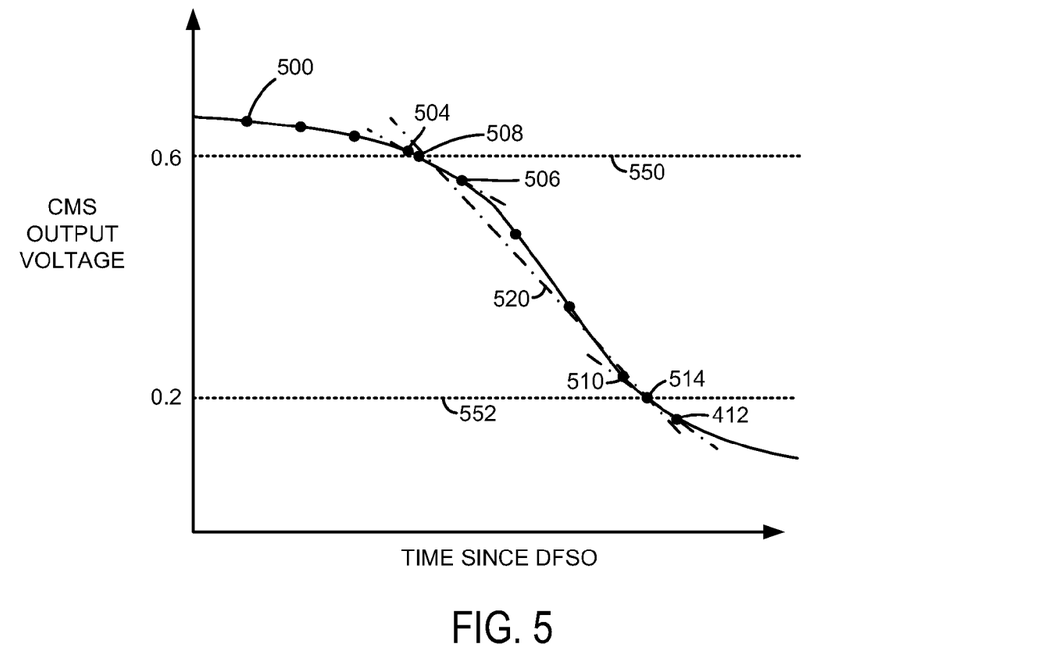
Figure 6:
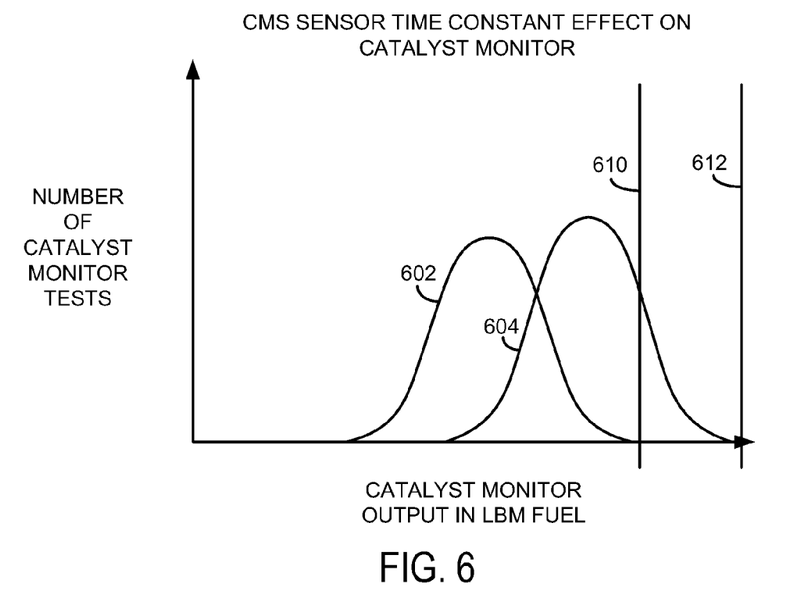
FIGS. 6 and 7 show plots of histograms illustrating differences in determined catalyst performance based on nominal and degraded oxygen sensor output.
Figure 7:
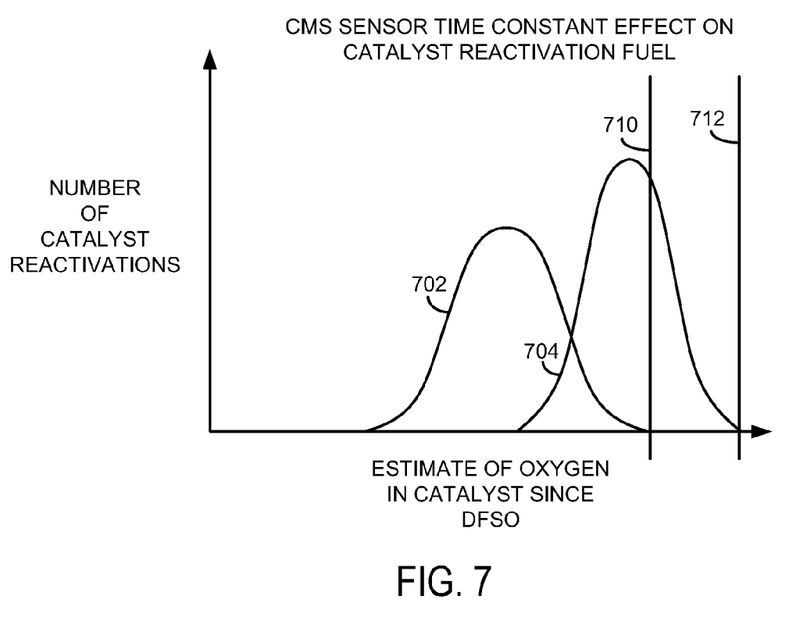
Figure 8:
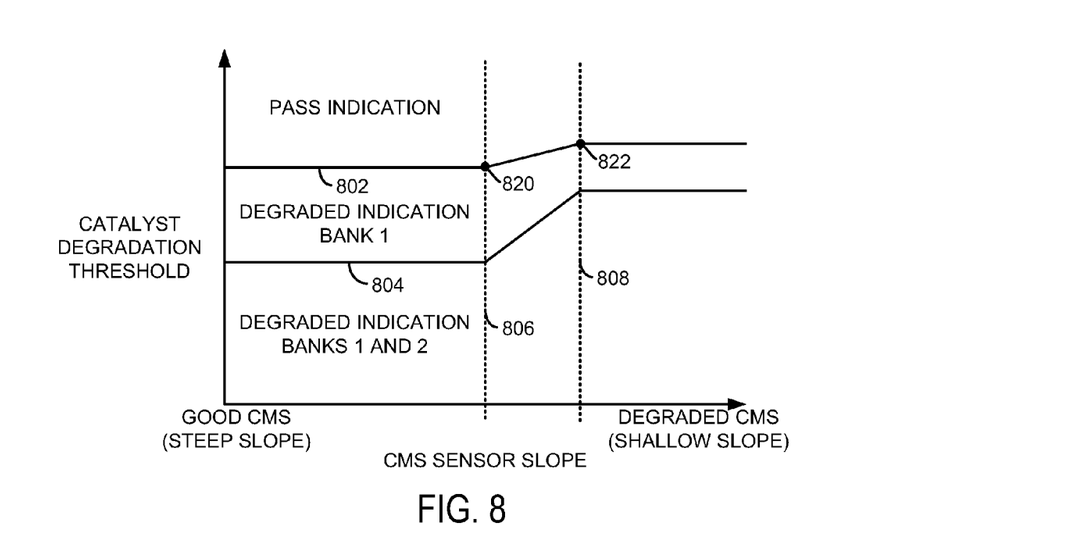
FIGS. 8 and 9 show example adjustments to catalyst performance and catalyst reactivation fuel thresholds that are based on response of an oxygen sensor.
Figure 9:
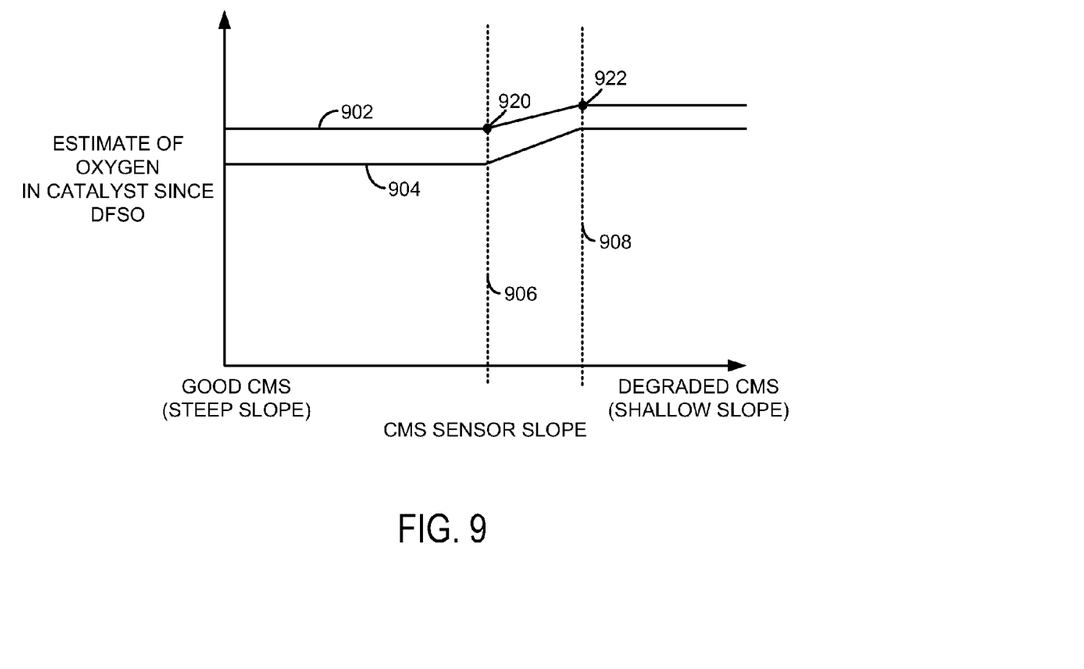
Figure 10:
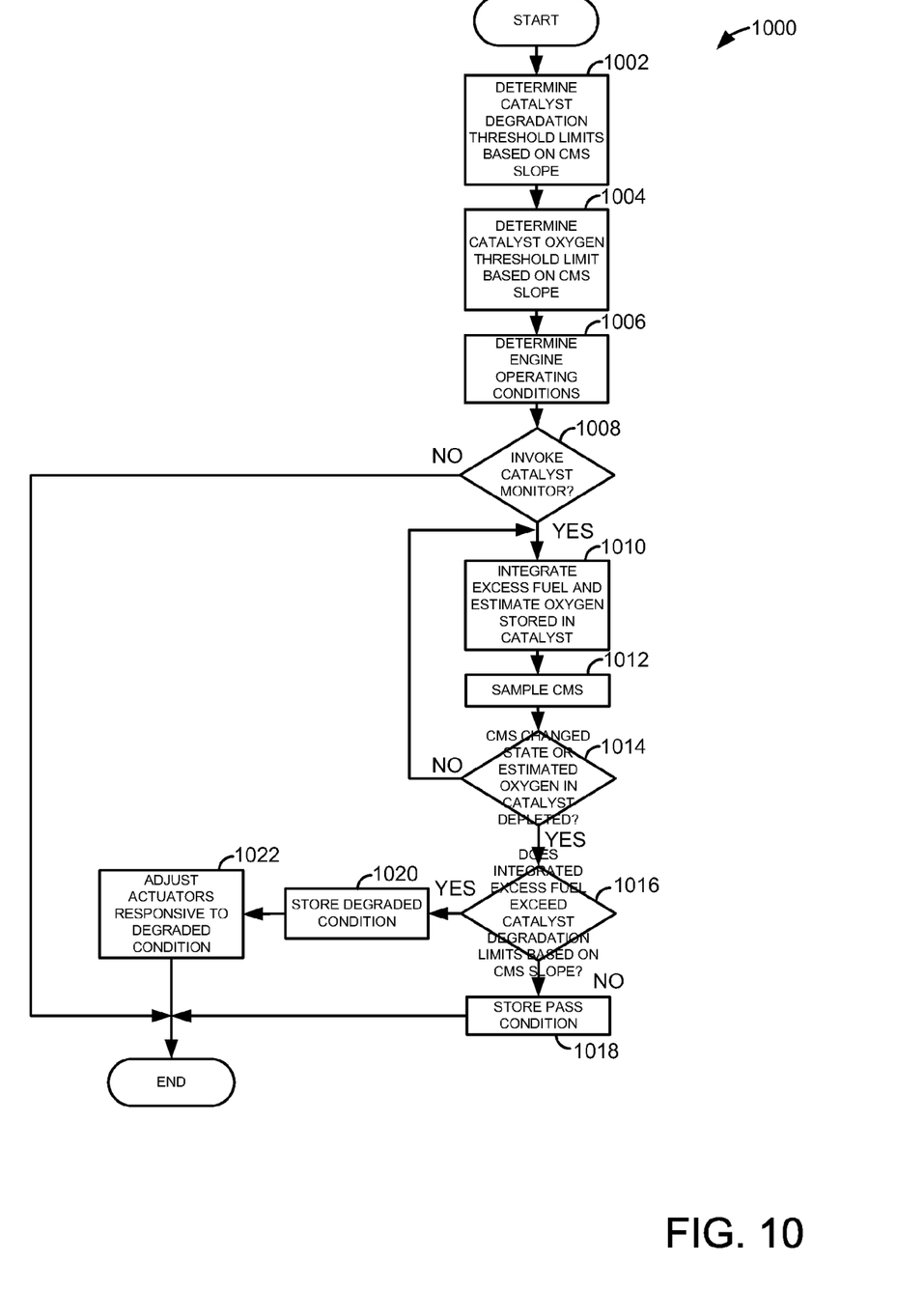
FIG. 10 is a flowchart of an example method for diagnosing a catalyst in a system where CMS performance may degrade.

The present description is related to diagnosing performance of a vehicle's catalyst, the catalyst processing exhaust gas of an internal combustion engine. The description provides for adjusting catalyst diagnostic limits and catalyst oxygen storage limits based on operating characteristics of one or more oxygen sensors located in the vehicle's exhaust system. One example engine and exhaust system is shown in FIG. 1. Example catalyst diagnostic sequences are shown in FIGS. 2 and 3. Outputs for a nominal new catalyst monitoring sensor (CMS) and a degraded CMS are shown in FIGS. 4 and 5. Effects of CMS output on catalyst diagnostic estimates are shown in FIGS. 6 and 7. Catalyst monitor thresholds and limits based on CMS slope estimates are shown in FIGS. 8 and 9. A method for diagnosing a catalyst in a system where the CMS output may degrade is shown in FIG. 10.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Timing of exhaust cam 53 may be varied with respect to timing of crankshaft 40 using exhaust cam phase adjuster 56 so as to adjust exhaust valve opening and closing positions relative to crankshaft position. Timing of intake cam 51 may be varied with respect to timing of crankshaft 40 using exhaust cam phase adjuster 59 so as to adjust exhaust valve opening and closing positions relative to crankshaft position.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width of a signal from controller 12. Fuel is delivered to fuel injector 66 by a fuel system (not shown) including a fuel tank, fuel pump, and fuel rail. In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Catalyst monitor sensor (CMS) 127 is a heated oxygen sensor (HEGO) that provides an output as shown in FIG. 4.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also display variables and control parameters to user display 39. For example, if a sensor or device is determined to be degraded, controller 12 may display an indication of the degraded device on display 39.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a vehicle system, comprising: an engine; a catalyst in fluidic communication with the engine; a catalyst monitor sensor positioned in an exhaust passage downstream of the catalyst; and a controller including executable instructions stored in non-transitory memory for adjusting an actuator in response to a catalyst monitor threshold that is based on an attribute of the catalyst monitor sensor. The vehicle system includes where the attribute is a slope of the catalyst monitor sensor. The vehicle system includes where the slope is between a rich catalyst monitor output threshold and a lean catalyst monitor output threshold. The vehicle system further comprises additional executable instructions for limiting an estimate of catalyst oxygen storage in response to the attribute of the catalyst monitor sensor. The vehicle system further comprises additional executable instructions for ending a diagnostic in response to an estimate of oxygen stored in the catalyst being zero. The vehicle system includes where the actuator is a fuel injector.

Referring now to FIG. 2, a simulated catalyst diagnostic sequence is shown. The sequence of FIG. 2 represents a catalyst diagnostic sequence where the catalyst is determined to pass operating requirements. The operating sequence may be performed by the system of FIG. 1 according to the method of FIG. 10. Vertical lines T0-T4 represents times of particular interest in the sequence.

The first plot from the top of FIG. 2 is a plot of engine exhaust based engine air-fuel ratio versus time. The engine air fuel ratio is determined from the oxygen concentration in engine exhaust. Horizontal line 202 represents a stoichiometric air-fuel ratio. The engine operates lean when the air-fuel ratio trace is above line 202 and rich when the air-fuel ratio trace is below line 202. The X axis represents time and time increases from the left side of FIG. 2 to the right side of FIG. 2.

The second plot from the top of FIG. 2 is a plot of CMS output voltage versus time. The CMS output voltage may vary between zero and one volt. A value of one volt indicates oxygen content of a rich air-fuel mixture. A value of zero volts indicates oxygen content of a lean air-fuel mixture. Exhaust gases resulting in a voltage greater than 0.45 volts are interpreted as exhaust gases of a rich air-fuel mixture. Exhaust gases resulting in a voltage less than 0.45 volts are interpreted as exhaust gases of a lean air-fuel mixture. The Y axis represents CMS volts as indicated. The X axis represents time and time increases from the left side of FIG. 2 to the right side of FIG. 2.

The third plot from the top of FIG. 2 is a plot of integrated excess fuel supplied to the engine to provide catalyst breakthrough after a deceleration fuel shut off (DFSO) event. Horizontal line 204 represents a threshold amount of excess fuel supplied to the engine that is expected to cause rich exhaust constituent breakthrough (e.g., rich engine exhaust products pass through the catalyst without being oxidized) on a full useful life catalyst (e.g., a catalyst that is performing acceptably to meet a desired emissions level at an end of its useful line (100,000 miles for example)). The Y axis represents integrated excess fuel to provide catalyst breakthrough and the amount of integrated excess fuel to provide catalyst breakthrough increases in the direction of the Y axis arrow. The integrated excess fuel to provide catalyst breakthrough is based on a fuel amount rich of a stoichiometric fuel amount integrated over the time the CMS output is indicating lean or the time from fuel injector activation after DFSO until the estimated oxygen stored in the catalyst is zero. The X axis represents time and time increases from the left side of FIG. 2 to the right side of FIG. 2.

The fourth plot from the top of FIG. 2 is a plot of estimated oxygen stored in a catalyst during DFSO. The Y axis represents estimated oxygen stored in the catalyst during DFSO and the estimated oxygen stored in the catalyst increases in the direction of the Y axis arrow. The X axis represents time and time increases from the left side of FIG. 2 to the right side of FIG. 2. Horizontal line 210 represents a limit of estimated oxygen stored in the catalyst during DFSO. Thus, the estimated amount of oxygen stored in the catalyst does not exceed the level 210.

At time T0, the engine exhaust indicates that the engine is operating with a near stoichiometric air-fuel ratio and the CMS sensor is indicating slightly rich exhaust gas constituents at a post catalyst location. The integrated amount of integrated excess rich combustion products supplied to the catalyst after DFSO is zero and the estimated oxygen stored in the catalyst during DFSO is zero. Thus, the engine is not operating in a DFSO mode.

At time T1, the engine exhaust indicates that the engine is operating in DFSO mode since the engine exhaust gases are much leaner than exhaust gases for stoichiometric combustion. The engine may enter DFSO mode in response to a driver releasing an accelerator pedal (not shown). During DFSO, the engine continues to rotate and fresh air is pumped through the engine without fuel and the exhaust system causing the engine exhaust base engine air-fuel ratio to show very lean conditions. The fresh air pumped through the exhaust system oxidizes hydrocarbons and CO in the catalyst and creates exhaust products that indicate lean conditions. The CMS output transitions from rich to lean as air passes through the catalyst. The integrated amount of excess fuel supplied to the engine to provide catalyst breakthrough is at a level of zero since fuel injectors are not active or supplying fuel to the engine after DFSO. The estimated oxygen stored in the catalyst increases after the engine exhaust based engine air-fuel ratio transitions to lean. The estimated oxygen stored in the catalyst reaches a level and remains constant until time T2. The level that the estimated oxygen stored in the catalyst reaches 210 is a limited level that represents the mean three sigma (e.g., three standard deviations as shown in FIG. 7 at 710 and 712) amount to ensure that a threshold catalyst (e.g., best degraded catalyst that meets emission on board diagnostic regulations) will breakthrough rich (e.g., rich combustion products pass through the catalyst without being treated) when excess fuel combustion products are supplied to the catalyst.

At time T2, the engine exhaust based engine air-fuel ratio transitions from lean (not combusting and air-fuel mixture) DFSO mode to rich (combusting an air-fuel mixture) catalyst reactivation mode in response to an increasing engine torque request (not shown). By transitioning rich after operating lean, it may be possible to reduce tailpipe NOx via utilizing oxygen to oxidize CO and hydrocarbons. The CMS output continues to indicate lean exhaust gas constituents (e.g., low voltage) since few rich exhaust gas constituents pass through the catalyst to reach the CMS. The integrated amount of excess rich combustion products to provide catalyst breakthrough begins to increase as rich exhaust gas constituents are supplied to the catalyst from the engine. The estimated oxygen stored in the catalyst begins to decrease as oxygen stored in the catalyst is used to oxidize hydrocarbons and CO in the engine exhaust gas constituents.

At time T3, the estimated oxygen stored in the catalyst reaches a value of zero since the oxygen in the catalyst is estimated to be depleted. However, the CMS sensor continues to provide a low voltage indicating that the exhaust gases downstream of the catalyst actually exhibit lean constituent levels, thereby indicating that the catalyst actually has stored more oxygen than is estimated. The engine exhaust based engine air-fuel ratio transitions out of catalyst reactivation mode to a stoichiometric engine air-fuel ratio mode in response to the estimated oxygen value reaching zero. Since the estimated oxygen level stored in the catalyst reaches zero, the integrated amount of excess fuel to provide catalyst breakthrough is increased by a predetermined amount that is based on CMS output at the time the estimated oxygen level stored in the catalyst reaches zero. Since the integrated amount of excess fuel to provide catalyst breakthrough is greater than threshold 204, the catalyst is judged working properly and the catalyst monitor outputs a pass indication. Threshold 204 is based on the curve shown in FIG. 8.

At time T4, the CMS output transitions to indicate rich conditions within the catalyst. The catalyst monitor has completed by the time the CMS sensor transitions to indicate rich conditions. In this way, a catalyst may be monitored and evaluated to determine if the catalyst is operating in a desired way.

Referring now to FIG. 3, a simulated catalyst diagnostic sequence is shown. The sequence of FIG. 3 represents a catalyst diagnostic sequence where the catalyst is determined to not pass expected operating requirements. The operating sequence may be performed by the system of FIG. 1 according to the method of FIG. 10. Vertical lines T10-T13 represents times of particular interest in the sequence. The plots of FIG. 3 represent plots of the same variables described in FIG. 2. Therefore, for the sake of brevity, a description of the plots is omitted for FIG. 3.

At time T10, the engine exhaust indicates that the engine is operating with a near stoichiometric air-fuel ratio and the CMS sensor is indicating slightly rich exhaust gas constituents at a post catalyst location. The integrated amount of integrated excess rich combustion products supplied to the catalyst after DFSO is zero and the estimated oxygen stored in the catalyst during DFSO is zero. Thus, the engine is not operating in a DFSO mode.

At time T11, the engine exhaust indicates that the engine exhaust gases indicate that the engine is operating in DFSO mode since the engine exhaust gases are much leaner than exhaust gases for stoichiometric combustion. The engine may enter DFSO mode in response to a driver releasing an accelerator pedal (not shown). The CMS output transitions from rich to lean as air passes through the catalyst. The integrated amount of excess fuel to provide catalyst breakthrough is at a level of zero since fuel injectors are not active or supplying fuel to the engine after DFSO. The estimated oxygen stored in the catalyst increases after the engine exhaust based engine air-fuel ratio transitions to lean. The estimated oxygen stored in the catalyst reaches a level and remains constant until time T2. The level that the estimated oxygen stored in the catalyst reaches 210 is a limited level that represents the mean three sigma (e.g., three standard deviations as shown at 710 and 712 in FIG. 7) amount to ensure that a threshold catalyst will breakthrough.

At time T12, the engine exhaust based engine air-fuel ratio transitions from lean (not combusting and air-fuel mixture) DFSO mode to rich (combusting an air-fuel mixture) catalyst reactivation mode in response to an increasing engine torque request (not shown). By transitioning rich after operating lean, it may be possible to reduce tailpipe NOx via utilizing oxygen to oxidize CO and hydrocarbons. The CMS output continues to indicate lean exhaust gas constituents (e.g., low voltage) since few rich exhaust gas constituents pass through the catalyst to reach the CMS. The integrated amount of excess rich combustion products to provide catalyst breakthrough begins to increase as rich exhaust gas constituents are supplied to the catalyst from the engine. The estimated oxygen stored in the catalyst begins to decrease as oxygen stored in the catalyst is used to oxidize hydrocarbons and CO in the engine exhaust gas constituents.

At time T13, the CMS output changes state to a higher level to indicate rich exhaust gas conditions downstream of the catalyst in response to exhaust gases, but the estimated oxygen stored in the catalyst has not reached a value of zero since the oxygen in the catalyst is estimated to not be depleted. However, the estimated oxygen stored in the catalyst is transitioned to a value of zero in response to the change in CMS state. The CMS state change transitions the engine from catalyst reactivation mode to stoichiometric mode. The engine exhaust based engine air-fuel ratio transitions out of catalyst reactivation mode to a stoichiometric engine air-fuel ratio mode in response to the CMS state change. Integration of the amount of excess fuel to provide catalyst breakthrough is also stopped in response to the CMS changing state. Since the integrated amount of excess fuel to provide catalyst breakthrough is less than threshold 204, the catalyst is judged to be degraded and the catalyst monitor does not output a pass indication. The threshold 204, is based on the curve shown in FIG. 8. The catalyst monitor is completed in response to the time the CMS sensor transitions to indicate rich conditions. In this way, a catalyst monitor is activated in response to entering DFSO mode and is exited in response to a CMS sensor changing from a lean state to a rich state or in response to an estimated amount of oxygen stored in a catalyst reaching a value of zero.

Referring now to FIG. 4, a plot of simulated CMS output characteristics is shown. Additionally, a method for determining a slope of the CMS output is described based on CMS output. The CMS output characteristics shown in FIG. 4 represent characteristics of a non-degraded CMS output.

The plot shows a Y axis representative of CMS output voltage. The X axis represents time since DFSO and time increases from the left side of FIG. 4 to the right side of FIG. 4. Horizontal line 450 at 0.6 volts represents a threshold voltage level to indicate rich engine exhaust gases. Horizontal line 452 at 0.2 volts represents a threshold voltage level to indicate lean engine exhaust gases. It should be appreciated that the voltage levels described herein are examples and that different voltage levels for different systems and sensors is anticipated.

Dots like 400 along the CMS trace indicate example samples taken during a time before and during DFSO where the engine is operating near stoichiometry to a time when fuel injection stops and the engine is in DFSO or interpolated values. Sample 404 represents a last CMS output voltage sampled before the CMS output is less than level 450. Sample 406 represents a first CMS output voltage sampled after CMS output is less than level 450. Interpolated value 408 is a linear interpolated estimate of the time CMS output is at level 450. The location of sample 408 is determined from the equation of the slope=(y2−y1/x2−x1) and the equation of a straight line y=mx+b. Where y2 is CMS voltage of a second sample, x2 is time of the second sample, y1 is CMS voltage of a first sample, x1 is time of the first sample, m is slope, b is the offset, y is CMS voltage, and x is time. The location of sample 408 is the basis for determining slope 420 which is an estimate of a slope of the CMS output voltage.

Similarly, the location of sample 414 is a linear interpolated estimate of the time CMS output is at level 452. Thus, the location of sample 414 is determined from samples at samples 410 and 412. Sample 410 represents a last CMS output voltage sampled before the CMS output is less than level 452. Sample 412 represents a first CMS output voltage sampled after CMS output is less than level 452. The slope of segment 420 is determined using the slope equation above and the positions of samples at samples 408 and 414. An example slope value for a non-degraded CMS may be a value of −10.

Referring now to FIG. 5, a plot of simulated CMS output characteristics is shown. The CMS output characteristics shown in FIG. 5 represent characteristics of a degraded CMS output.

The plot shows a Y axis representative of CMS output voltage. The X axis represents time since DFSO and time increases from the left side of FIG. 5 to the right side of FIG. 5. Horizontal line 550 at 0.6 volts represents a voltage level to indicate rich engine exhaust gases. Horizontal line 552 at 0.2 volts represents a voltage level to indicate lean engine exhaust gases.

Samples like 500 along the CMS trace indicate example samples taken during a time before and during DFSO where the engine is operating near stoichiometry to a time when fuel injection stops and the engine is in DFSO. Sample 504 represents a last CMS output voltage sampled before the CMS output is less than level 550. Sample 506 represents a first CMS output voltage sampled after CMS output is less than level 550. Sample 508 is a linear interpolated estimate of the time CMS output is at level 550. The location of sample 508 is determined from the equation of the slope=(y2−y1/x2−x1) and the equation of a straight line y=mx+b. The location of sample 508 is determined to determine slope 520 which is an estimate of a slope of the CMS output voltage.

Similarly, the location of sample 514 is a linear interpolated estimate of the time CMS output is at level 552. Thus, the location of sample 514 is determined from samples at samples 510 and 512. Sample 510 represents a last CMS output voltage sampled before the CMS output is less than level 552. Sample 512 represents a first CMS output voltage sampled after CMS output is less than level 552. The slope of segment 520 is determined using the slope equation above and the positions of samples at samples 508 and 514. An example slope value for a non-degraded CMS may be a value of −2.

In this way, it may be determined that a degraded CMS exhibits a lower slope than a non-degraded CMS. The lower slope may cause estimates of catalyst oxygen storage capacity to increase, thereby making it more difficult to diagnose a degraded catalyst in the presence of a reduced CMS slope.

Referring now to FIG. 6, plots of histograms showing the effect of CMS slope on catalyst monitor output is shown. The catalyst monitor outputs an integrated amount of excess rich fuel to provide catalyst breakthrough in units of pounds mass fuel after exiting DFSO as shown in the third plots of FIGS. 2 and 3. The Y axis represents numbers of catalyst monitor tests falling within sections of distribution curves 602 and 604. The X axis represents rich fuel to provide catalyst breakthrough in units of pounds mass fuel and the rich fuel amount increases in the direction of the X axis arrow.

Distribution 602 represents a distribution of a number of catalyst monitor executions where the CMS slope during DFSO and catalyst reactivation has a steeper slope (e.g. FIG. 4) that does not indicate CMS degradation. Distribution 604 represents a distribution of a number of catalyst monitor executions where the CMS slope during DFSO and catalyst reactivation has a shallower slope (e.g., FIG. 5) that indicates some CMS degradation. The distributions 602 and 604 are based on catalyst monitor executions using a same catalyst. The catalyst is a threshold catalyst indicative of a degraded catalyst that meets minimum exhaust gas constituent conversion efficiency for emissions regulation. Thus, it may be observed that the distribution 604 is skewed or biased toward indicating that the catalyst has additional capacity to store rich combustion byproducts as compared to distribution 602. Vertical marker 610 is a three sigma catalyst monitor output value for the distribution 602 based on a nominal CMS time constant (e.g., a time constant for a new CMS). Vertical marker 612 is a three sigma catalyst monitor output value for the distribution 604, and the distribution 604 is based on a sensor having a slower than nominal sensor (e.g., new sensor) time constant that is slow enough to affect the catalyst monitor but not slow enough to indicate a degraded CMS.

Thus, if a degraded CMS sensor is a basis for diagnosing a catalyst without compensating for the CMS sensor degradation, a significant percentage of catalyst monitor tests will exceed the 610 threshold and be erroneously reported as catalysts that do not meet the desired performance characteristics. However, if the catalyst threshold 610 is adjusted to the level of threshold 612, the catalyst monitor will indicate that the catalyst is performing within expected limits. In this way, catalyst monitor threshold limits may be adjusted for CMS output to provide an improved estimate of catalyst operating capability.

Referring now to FIG. 7, plots of histograms showing the effect of CMS slope on estimated oxygen stored in a catalyst is shown. The catalyst monitor estimates oxygen stored in a catalyst and uses the estimate to judge when oxygen stored in the catalyst is depleted during catalyst reactivation after DFSO. The catalyst monitor test may be completed in response to the oxygen estimate being depleted at an earlier time than is expected. Thus, it may be desirable to have an accurate estimate of oxygen stored in the catalyst for purposes of judging if the catalyst is degraded more than a threshold amount or performing as desired. The estimate of oxygen stored in the catalyst is shown at the fourth plots from the top of FIGS. 2 and 3. The Y axis represents numbers of catalyst reactivations after DFSO falling within sections of distribution curves 702 and 704. The X axis represents estimate oxygen stored within the catalyst in units of pounds mass and the stored oxygen amount increases in the direction of the X axis arrow.

Distribution 702 represents a distribution of a number of catalyst reactivations after DFSO where the CMS slope used during DFSO and catalyst reactivation has a steeper slope (e.g. FIG. 4) that does not indicate CMS degradation. Distribution 704 represents a distribution of a number of catalyst monitor executions where the CMS slope during DFSO and catalyst reactivation is a shallower slope (e.g., FIG. 5) that indicates some CMS degradation. The distributions 702 and 704 are based on catalyst reactivations after DFSO using a same catalyst. The catalyst is a threshold catalyst test piece indicative of a degraded catalyst that meets minimum exhaust gas constituent conversion efficiency. Thus, it may be observed that the distribution 704 is skewed or biased toward indicating that the catalyst has additional capacity to store oxygen as compared to distribution 702. Vertical marker 710 is a three sigma (standard deviation) catalyst monitor output value for the distribution 702. Vertical marker 712 is a three sigma catalyst monitor output value for the distribution 704.

In this way, if a degraded CMS sensor is a basis for reactivating a catalyst without compensating for the CMS sensor degradation, a significant percentage of catalyst monitor tests will estimate oxygen storage exceeding the 710 threshold and be erroneously used as a basis for determining stored oxygen in a catalyst used as a basis for determining catalyst degradation. However, if the catalyst threshold 710 is adjusted to the level of threshold 712, the catalyst monitor will provide an improved estimate for the amount of oxygen stored within the catalyst for catalyst monitor based catalyst degradation estimation. Thus, catalyst monitor oxygen storage threshold limits may be adjusted for CMS output to provide an improved estimate of catalyst operating capability.

Referring now to FIG. 8, a plot of catalyst degradation thresholds versus CMS slope is shown. The catalyst degradation thresholds are a basis for the catalyst monitor indicating or not indicating catalyst degradation. The Y axis represents a catalyst degradation threshold in units of pounds mass fuel. For example, a portion of a catalyst threshold curve (e.g., 802 and 804) is shown as threshold 204 in FIGS. 2 and 3. Thus, the integrated amount of excess rich fuel to provide catalyst breakthrough is compared to one of catalyst threshold curves 802 and 804 to determine if a catalyst is degraded. The portion of curves 802 and 804 that is used to evaluate the integrated amount of excess rich fuel is determined from the CMS slopes (e.g., the X axis) for each of the respective cylinder banks. The X axis value starts near the Y axis with a large value and the value decreases in the direction of the X axis arrow.

Curve 802 represents a catalyst degradation threshold for a first engine cylinder bank. Curve 804 represents a catalyst degradation threshold for a second engine cylinder bank. The difference in fuel mass between the two curves may be attributable to CMS location and exhaust system configuration. For a system including two catalyst bricks and two CMS, a catalyst monitor algorithm judges if either or both catalysts are degraded for diagnostic purposes based on thresholds or curves 802 and 804. The portion of curves 802 and 804 between vertical marker 806 and vertical marker 808 is an adjustment for CMS sensor degradation beginning at a CMS slope that indicates lack or absence of CMS degradation (e.g., from the Y axis to 806) to a CMS slope that is a CMS slope where the CMS is judged to be degraded significantly enough to invalidate the catalyst monitor (e.g., from 808 to the shallowest slope at the extent of the X axis). Thus, the zone between vertical marker 806 and vertical marker 808 is an adjustment to the catalyst threshold level for judging if a catalyst is degraded, where the adjustment is based on an amount of CMS degradation.

The catalyst degradation threshold value of curve 802 between the Y axis and 806 for cylinder bank one is the catalyst monitor three sigma output for a threshold catalyst and a new CMS (e.g., fast time constant sensor) as shown in FIG. 6 at 610. The catalyst degradation threshold value of curve 802 between 808 and the extent of the X axis for cylinder bank one is the catalyst monitor three sigma output for a threshold catalyst and a partially degraded CMS (e.g., slow time constant sensor) as shown in FIG. 6 at 612. The catalyst degradation threshold value for curve 802 between 806 and 808 is a linear interpolation between the values at 820 and 822. The threshold values for curve 804 are determined in a similar way.

Referring now to FIG. 9, a plot of catalyst stored oxygen since DFSO versus CMS slope is shown. The catalyst stored oxygen limits for two cylinder banks are indicated by curves 902 and 904. The catalyst stored oxygen limits are a basis for determining the amount of catalyst reactivation fuel (e.g., fuel amount in excess of a fuel amount that provides a stoichiometric air-fuel to the engine) to supply the engine after engine fueling resumes after fuel flow is stopped during DFSO.

Curve 902 represents a catalyst oxygen storage estimate for a first engine cylinder bank. Curve 904 represents a catalyst oxygen storage estimate for a second engine cylinder bank. The difference in oxygen stored in the catalysts between the two curves may be attributable to catalyst volume, CMS location, catalyst brick composition, and exhaust system configuration. For a system including two catalyst bricks and two CMS, a catalyst monitor algorithm uses catalyst oxygen storage estimates for two different cylinder banks to determine amount of reactivation fuel to supply to the two different cylinder banks. The portion of curves 902 and 904 between vertical marker 906 and vertical marker 908 is an adjustment for CMS sensor degradation beginning at a CMS slope that indicates lack or absence of CMS degradation (e.g., from the Y axis to 906) to a CMS slope that is a CMS slope where the CMS is judged to be degraded significantly enough to invalidate the catalyst monitor (e.g., from 908 to the shallowest slope at the extent of the X axis). Thus, the zone between vertical marker 906 and vertical marker 908 is an adjustment to the catalyst oxygen storage limit based on an amount of CMS degradation.

The catalyst oxygen storage estimate limit of curve 902 between the Y axis and 906 for cylinder bank one is the catalyst monitor three sigma oxygen storage estimate limit for a threshold catalyst and a new CMS (e.g., fast time constant sensor) as shown in FIG. 7 at 710. The catalyst oxygen storage estimate limit of curve 902 between 908 and the extent of the X axis for cylinder bank one is the catalyst monitor three sigma oxygen storage estimate limit for a threshold catalyst and a partially degraded CMS (e.g., slow time constant sensor) as shown in FIG. 7 at 712. The catalyst oxygen storage limit value for curve 902 between 906 and 908 is a linear interpolation between the values at 920 and 922. The threshold values for curve 904 are determined in a similar way.

Referring now to FIG. 10, a flowchart of an example method for diagnosing a catalyst in a system where CMS performance may degrade is shown. The method of FIG. 10 may provide the operating sequences shown in FIGS. 2 and 3. Further, the method of FIG. 10 may be included in the system of FIG. 1 as executable instructions stored in non-transitory memory.

At 1002, method 1000 determines catalyst degradation threshold limits based on CMS slope. Method 1000 determines the CMS slope as described in FIGS. 4 and 5. In particular, method 1000 samples CMS sensor voltage during DFSO. A time CMS output is at a first threshold voltage (e.g., 408 of FIG. 4) is estimated by linearly interpolating between a first sample before (e.g., 404 of FIG. 4) and a first sample after (e.g., 406 of FIG. 4) CMS output transitions through the first threshold voltage. The first threshold voltage is known (e.g., 450 of FIG. 4) and the time that the CMS output is estimated to have output the first threshold voltage is the unknown. The slope between the first sample (e.g., 404 of FIG. 4) and the second sample (e.g., 406 of FIG. 4) is determined according to the slope equation, and the time the CMS output is at the first threshold voltage is determined from the equation of a straight line, the slope, and the threshold voltage.

A time CMS output is at a second threshold voltage (e.g., 414 of FIG. 4) is estimated by linearly interpolating between a first sample before (e.g., 410 of FIG. 4) and a first sample after (e.g., 412 of FIG. 4) CMS output transitions through the second threshold voltage. The second threshold voltage is known (e.g., 452 of FIG. 4) and the time that the CMS output is estimated to have output the second threshold voltage is the unknown. The slope between a third sample (e.g., 410 of FIG. 4) and the fourth sample (e.g., 412) of FIG. 4) is determined according to the slope equation, and the time the CMS output is at the first threshold voltage is determined from the equation of a straight line, the slope, and the threshold voltage.

The CMS slope is determined based on the first threshold voltage, a time the CMS output passes through the first threshold voltage, the second threshold voltage, and a time the CMS output passes through the second threshold voltage. The first threshold voltage and time the CMS output passes through the first threshold voltage defines a first point. The second threshold voltage and time the CMS output passes through the second threshold voltage defines a second point. The first and second points are input to the equation of a slope to determine the CMS slope.

The catalyst monitor threshold limits are determined by activating the catalyst monitor a plurality of times with a new CMS (steep slope) and a threshold catalyst. The catalyst monitor outputs an integrated amount of excess rich fuel (e.g., fuel richer than a stoichiometric mixture) to provide catalyst breakthrough of the threshold catalyst. A three sigma integrated amount of excess rich fuel is selected from the plurality of catalyst monitor activations. This three sigma value is the catalyst degradation threshold when the CMS is new (e.g., fast time constant) as is shown for curve 802 between the Y axis and 806 of FIG. 8.

The catalyst monitor is also activated a plurality of times with a partially degraded CMS (shallow slope) and a threshold catalyst. The catalyst monitor outputs an integrated amount of excess rich fuel (e.g., fuel richer than a stoichiometric mixture) to provide catalyst breakthrough of the threshold catalyst. A three sigma integrated amount of excess rich fuel is selected from the plurality of catalyst monitor activations. This three sigma value is the catalyst degradation threshold when the CMS is partially degraded (e.g., slow time constant) as is shown for curve 802 between 808 and the extent of the X axis.

The catalyst degradation threshold between the threshold representing a new CMS and the partially degraded CMS is determined via linearly interpolating between the three sigma integrated amount of excess rich fuel for the new CMS (steep slope) and the three sigma integrated amount of excess rich fuel for the partially degraded CMS (shallow slope). For example, the three sigma catalyst degradation threshold for a new CMS and the slope of the new CMS represent a first point, the three sigma catalyst degradation threshold for a partially degraded CMS and the slope of the partially degraded CMS represent a second point. The slope for the line between the first and second point is determined from the first and second point using the slope equation and the slope. The slope and the first point are input into an equation of a straight line to determine the offset b. In this way, the equation of the straight line between the first point and the second point may be determined. The three portions of a curve (e.g., 802 of FIG. 8) representing the catalyst degradation threshold as a function of CMS slope may be determined in this way. Catalyst thresholds for a second cylinder bank may be determined in a similar way. Method 400 proceeds to 1004 after the catalyst threshold curve is determined.

At 1004, method 1000 determines catalyst stored oxygen threshold limits based on CMS slope. Method 1000 determines the CMS slope as described at 1002 and in FIGS. 4 and 5. The catalyst stored oxygen threshold limits are determined by activating the catalyst monitor a plurality of times with a new CMS (steep slope) and a threshold catalyst. The catalyst monitor estimates oxygen stored in a catalyst based on an amount of fuel in excess of a stoichiometric amount of fuel used to operate the engine after the engine exits a DFSO mode. A three sigma catalyst oxygen storage amount is selected from the plurality of catalyst monitor activations. This three sigma value is the catalyst oxygen storage amount limit when the CMS is new (e.g., steeper slope) as is shown for curve 902 between the Y axis and 906 of FIG. 9.

The catalyst monitor is also activated a plurality of times with a partially degraded CMS (shallow slope) and a threshold catalyst. The catalyst monitor outputs a catalyst oxygen storage amount based on an excess rich fuel amount supplied to the engine during catalyst reactivation. A three sigma catalyst oxygen storage amount is selected from the plurality of catalyst monitor activations. This three sigma value is the catalyst oxygen storage amount limit when the CMS is partially degraded (e.g., slow time constant) as is shown for curve 902 between 908 and the extent of the X axis.

The catalyst oxygen storage amount limit between the limit representing a new CMS and the partially degraded CMS is determined via linearly interpolating between the three sigma catalyst oxygen storage amount for the new CMS (steep slope) and the three sigma catalyst oxygen storage amount for the partially degraded CMS (shallow slope). For example, the three sigma catalyst oxygen storage amount for a new CMS and the slope of the new CMS represent a first point, the three sigma catalyst oxygen storage amount for a partially degraded CMS and the slope of the partially degraded CMS represent a second point. The slope for the line between the first and second point is determined from the first and second point using the slope equation and the slope. The slope and the first point are input into an equation of a straight line to determine the offset b. In this way, the equation of the straight line between the first point and the second point may be determined. The three portions of a curve (e.g., 902 of FIG. 9) representing the catalyst oxygen storage amount as a function of CMS slope may be determined in this way. Catalyst oxygen storage amount limits for a second cylinder bank may be determined in a similar way. Method 400 proceeds to 1006 after the catalyst oxygen storage amount limit curve is determined.

At 1006, method 1000 determines engine operating conditions. Engine operating conditions may include but are not limited to engine speed, engine load, ambient air temperature, engine air-fuel ratio, and vehicle speed. Method 1000 proceeds to 1008 after engine operating conditions are determined.

It should be noted that steps 1002-1006 need not be performed every time the catalyst monitor is invoked. Rather, steps 1002-1006 may be performed once with results stored in memory for later use.

At 1008, method 1000 judges if the catalyst monitor is to be invoked or executed. The catalyst monitor may be executed in response to the vehicle entering DSFO after the catalyst monitor has not been executed for a predetermined amount of time or events. For example, the catalyst monitor may be executed in response to the engine starting and not having executed the catalyst monitor during a time when the vehicle enters DFSO. If method 1000 judges that it is a desirable time to execute the catalyst monitor, the answer is yes and method 1000 proceeds to 1010. Otherwise, the answer is no and method 1000 proceeds to exit.

At 1010, method 1000 begins to integrate an amount of fuel in excess of stoichiometric fuel after the vehicle enters DFSO. Fuel flow is stopped during DFSO so fuel integration begins upon supplying a rich fuel mixture to the engine for catalyst reactivation. For example, if the engine is operating 5% rich and a fuel flow rate of 10 lbs/hr, method 1000 begins integrating a fuel flow rate of 0.5 lb/hr until the CMS indicates rich. Method 1000 proceeds to 1012 after integration of the fuel flow rate begins.

At 1012, method 1000 samples output of the CMS. The CMS provides an output voltage that corresponds to an oxygen concentration in the exhaust gases. The oxygen concentration corresponds to an engine air-fuel ratio. The CMS output voltage is sampled and stored to memory. Method 1000 proceeds to 1014 after the CMS is sampled.

At 1014, method 1000 judges if the CMS has changed state from lean to rich or if the estimated oxygen stored in the catalyst has been depleted by the excess fuel supplied to the engine. If the CMS changes from lean to rich, it is an indication that the oxygen storage capacity in the catalyst is depleted. The estimated oxygen stored in the catalyst is reduced down based on the mass of rich combustion products from fuel in excess of a stoichiometric air-fuel mixture supplied to the engine and delivered to the catalyst. If method 100 judges that the CMS has changed state or the estimated oxygen is reduced to zero as rich combustion products are introduced to the catalyst, the answer is yes and method 1000 proceeds to 1016. Otherwise, the answer is no and method 1000 returns to 1010.

At 1016, method 1000 judges if the integrated amount of excess fuel (e.g., mass of fuel richer than mass of fuel to provide a stoichiometric air-fuel ratio to the engine while the catalyst is being reactivated after DFSO) is greater than a threshold amount of fuel. If so, the answer is yes and method 1000 proceeds to 1022. If not, the answer is no and method 1000 proceeds to 1020.

At 1020, method 1000 stores an indication of a passing catalyst for the catalyst monitor. The catalyst passes when the catalyst exhibits more than a threshold amount of fuel is supplied to the engine to initiate rich combustion products exiting the catalyst. Method 1000 proceeds to exit after the pass indication is stored.

At 1022, method 1000 stores an indication of a degraded catalyst for the catalyst monitor. The indication may be in the form of adjusting a value of a variable. For example, a catalyst degradation variable may be changed from a value of zero to a value of one when catalyst degradation is determined. The catalyst may be degraded when the catalyst exhibits that less than a threshold amount of fuel is supplied to the engine to initiate rich combustion products exiting the catalyst. Method 1000 proceeds to 1024 after the degraded indication is stored.

At 1024, method 100 adjusts actuators in response to the indication of a degraded catalyst. In one example, fuel injection is adjusted in response to an indication of a degraded catalyst. For example, a peak to peak air-fuel ratio modulation level may be reduced to reduce the possibility of catalyst lean or rich breakthrough. Additionally, a light or display may inform the vehicle operator of catalyst degradation. In still other examples, other engine actuator adjustments may be made. Method 1000 proceeds to exit after actuators are adjusted.

In an alternative embodiment, CMS sensor time constant may be substituted for CMS slope although the two variables are not the same. Thus, the catalyst monitor threshold and the catalyst oxygen storage estimate limit may be based CMS time constant.

Thus, the method of FIG. 10 provides for a method for diagnosing a catalyst, comprising: adjusting a catalyst degradation threshold in response to a slope of a catalyst monitor sensor output; indicating catalyst degradation in response to a variable not exceeding the catalyst degradation threshold; and adjusting a state of an actuator in response to the indication of degradation. The method includes where the variable represents an amount of fuel in excess of a stoichiometric air-fuel mixture supplied to the engine after the engine exits a deceleration fuel shut-off mode.

The method of FIG. 10 also includes where the catalyst degradation threshold is increased as the slope of the catalyst monitor sensor decreases. The method also includes where the actuator provides an indication of catalyst degradation. The method includes where the actuator is a fuel injector. The method further comprises determining the slope based on a rich catalyst monitor sensor threshold level and a lean catalyst monitor sensor threshold level. The method includes where the catalyst monitor sensor is located downstream of a catalyst.

The method of FIG. 10 also includes a method for diagnosing a catalyst, comprising: adjusting a catalyst oxygen storage estimate limit in response to a slope of a catalyst monitor sensor output; adjusting a catalyst degradation threshold in response to the slope of a catalyst monitor sensor output; indicating catalyst degradation in response to a variable not exceeding the catalyst degradation threshold and the catalyst oxygen storage estimate being greater than zero; and adjusting a state of an actuator in response to the indication of degradation. The method includes where an catalyst oxygen storage estimate is greater than zero when a catalyst monitor changes from a lean state to a rich state.

The method also includes where the catalyst oxygen storage estimate limit is increased as the slope of the catalyst monitor sensor is decreased. The method further comprises integrating an amount of fuel supplied to an engine in excess of a stoichiometric amount of fuel supplied to the engine to operate the engine during catalyst regeneration after a deceleration fuel shut-off event, and where the integrated amount of fuel is the variable. The method includes where the integrated amount of fuel is the variable. The method further comprises sampling output of the catalyst monitor sensor to determine the slope. The method includes where the actuator is a display device.

As will be appreciated by one of ordinary skill in the art, method described in FIG. 10 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for diagnosing a catalyst, comprising:
adjusting a catalyst oxygen storage estimate limit, in response to a slope of a catalyst monitor sensor output;
adjusting a catalyst degradation threshold in response to the slope of a catalyst monitor sensor output;
indicating catalyst degradation in response to a variable not exceeding the catalyst degradation threshold; and
adjusting fuel injection of an engine via a fuel injector in response to the indication of degradation;
wherein, the catalyst monitor sensor is positioned in an exhaust passage downstream of the catalyst.

2. The method of claim 1, where the variable represents an amount of fuel in excess of a stoichiometric fuel amount supplied to the engine after the engine exits a deceleration fuel shut-off mode.

3. The method of claim 1, where the catalyst degradation threshold is increased as the slope of the catalyst monitor sensor decreases.

4. The method of claim 1, further comprising determining the slope based on a rich catalyst monitor sensor threshold level and a lean catalyst monitor sensor threshold level.

5. A vehicle system, comprising:
an engine;
a fuel injector;
a catalyst in fluidic communication with the engine;
a catalyst monitor sensor positioned in an exhaust passage downstream of the catalyst; and
a controller including executable instructions stored in non-transitory memory, which when executed:
adjust a catalyst oxygen storage estimate limit, in response to a slope of a catalyst monitor sensor output;
adjust a catalyst degradation threshold in response to the slope of a catalyst monitor sensor output;
indicate catalyst degradation in response to a variable not exceeding the catalyst degradation threshold; and
adjust fuel injection of the engine via the fuel injector in response to the indication of degradation.

6. The vehicle system of claim 5, further comprising additional executable instructions for limiting an estimate of catalyst oxygen storage.

7. The vehicle system of claim 5, further comprising additional executable instructions for ending a diagnostic in response to an estimate of oxygen stored in the catalyst being zero.

* * * * *